July 28, 1964  H. R. OTTO, JR  3,142,640
OIL FILTER
Filed March 15, 1961

INVENTOR.
HERBERT R. OTTO, JR.
BY Charles Marks
ATTORNEY

United States Patent Office 3,142,640
Patented July 28, 1964

3,142,640
OIL FILTER
Herbert R. Otto, Jr., 4 Dickson Drive, Westfield, N.J.
Filed Mar. 15, 1961, Ser. No. 95,942
1 Claim. (Cl. 210—136)

This invention relates generally to an improved oil filter of the throw-away type wherein the filter cartridge is permanently secured inside the filter shell. The invention is more particularly concerned with an improved throw-away type oil filter used in conjunction with automotive or other kinds of engines.

In the throw-away type of oil filter, as commonly used, a filter cartridge comprising a filter medium such as an annularly disposed, pleated filter paper, is received within a filter shell permanently sealed by a suitable end closure and adapted for connection with an engine lubricating system. The end closure is often provided with a series of apertures whereby oil to be filtered may be introduced from the engine lubricating system into the filter shell and allowed to flow into the vicinity of the aforesaid filter paper. Since the oil is usually introduced into the filter shell under pressure, it may be forced through the filter paper into an outlet passage which leads back to the engine lubricating system. In this manner, filtration of the oil may be quickly and easily accomplished.

During the useful life of such a filter, however, it is highly undesirable to permit unfiltered oil to return to the engine by way of drainback through the aforesaid apertures through which the oil is introduced into the filter shell or by way of any other route which permits the oil to avoid being forced through the filter paper. Otherwise, dirt, debris, contaminants and other foreign matter may accumulate in the engine lubricating system so as to produce engine wear and inefficient lubrication of engine parts.

The present invention is concerned with solving the problem of drainback prevention in an extremely simple manner and with a minimum of parts.

More specifically, it is an object of the present invention to provide an improved means for preventing drainback of unfiltered oil from an oil filter without the aid of any complex anti-drainback mechanism.

Another object of the invention is to provide an improved means of the character indicated which is simple in its operation, easy to manufacture and economical in design.

Another object of the invention is to provide an improved anti-drainback means which permits unfiltered oil to enter the oil filter with which said means is employed, for the purpose of permitting filtration thereof, but which obstructs efficiently the drainback of such infiltered oil to the lubricating system with which the filter is connected.

Other and more specific objects of the present invention will become apparent from the following description as read in connection with the accompanying drawing.

In the drawing.

In the various FIGURES depicted in the drawing, similar numerals are employed to refer to similar parts of the said form of the invention.

Figure 1:
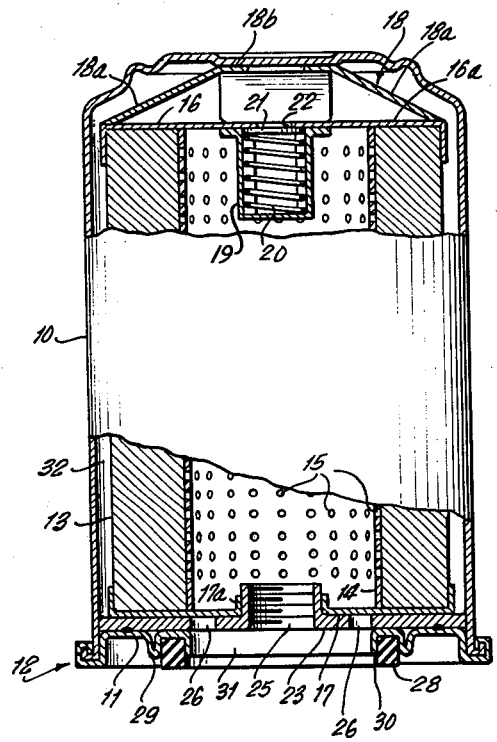
FIGURE 1 is a side elevational view of an oil filter incorporating one form of the invention, portions of said oil filter being shown in cross-section.

As shown in the drawing, one form of the present invention comprises a housing including a cylindrical filter shell 10 permanently secured to an end closure 11 in the conventional manner, as by a suitable annular seam, generally designated by the numeral 12.

A filter cartridge comprising a pleated paper annulus 13 surrounds a hollow cylinder 14 having a plurality of apertures such ash those designated by the numeral 15, the ends of the pleated paper annulus being sealed within upper and lower cups, designated respectively by the numerals 16 and 17.

The upper cup 16 presents a planar surface 16a which is maintained in contact with a yieldable spring member 18 comprising a plurality of inclined arms 18a extending radially from an upper central member 18b in contact with the inner surface of the upper portion of the filter shell 10. Other forms of spring members may also be employed in lieu of the last-described spring member. Thus, for example, a coil compression spring may be seated between the upper cup 16 and the inner surface of the upper portion of the filter shell.

The hollow cylinder 14 also supports a slotted tubular member 19 having a bottom portion which seats a coil spring 20 abutting against a disc 21. The spring is maintained in yieldable contact with the lower surface of said disc, the said disc also covering an aperture 22 formed in the upper cup 16.

The lower cup is provided with a sleeve 17a whose function will be hereinafter more fully described.

A rigid circular plate 23 is disposed adjacent to the end closure 11 and is secured in said position, as by spot welding 24 to the end closure 11. The plate is provided with a tube 25a having a threaded aperture 25 and formed integrally with the plate 23. A plurality of apertures 26 are provided in the plate 23 and surround the tube 25a.

An important feature of the invention resides in the fact that the sleeve 17a is vertically movable in slidable contact with the external periphery of the internally threaded tube 25a.

Figure 3:
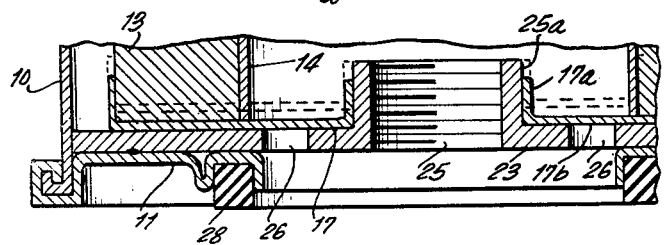
FIGURE 3 is an enlarged fragmentary cross-sectional view similar to that of a portion of FIGURE 2 but depicting the closed as well as an open position of the anti-drainback means employed in the said form of the invention.

The lower cup 17 has a planar face 17b which is normally disposed in contact with the plate 23 in the position depicted in FIGURE 1 and in FIGURE 3 (in solid lines), this position being hereinafter referred to as the closed position of the lower cup 17. The spring member 18 urges the filter cartridge, including the lower cup 17, downwardly so as to accomplish said closed position of the lower cup 17 when an opposing pressure, applying upon said lower cup 17 a force less than that accomplished thereon by the spring member 18, is present.

The oil filter may be engaged with the lubricating system of an engine by means of the internally threaded central aperture 25. This aperture 25 may be threadedly engaged with an inlet (not shown) of such a lubricating system, such engagement also bringing a sealing member, such as the annular gasket 28 supported by the circular lips 29 and 30 surrounding the mouth 31 of the end closure 11, into surrounding engagement with respect to an inlet (not shown) of such a lubricating system, according to the conventional manner, the said outlet being suitably separated from the said inlet of the lubricating system, the said mouth 31 being in communication with the apertures 25 and 26. When the planar surface 17b of the lower cup 17 is subjected to the pressure of the oil in the said lubricating system, exerted by way of the apertures 26, the lower cup 17 will be urged upwardly against the bias of the spring member 18, thereby raising the lower cup 17 to the position depicted in FIGURE 2 and in FIGURE 3 (in dotted lines), for example. This raised position will be hereinafter referred to as the open position of the lower cup 17 and permits unfiltered oil to flow from the outlet of the engine lubricating system through the apertures 26 and into the annular area 33 between the planar surface 17b of the lower cup 17 and the plate 23. From this area 33 the unfiltered oil will travel into the annular space 32 surrounding the pleated paper annulus 13. Said oil will then be forced by the pressure of the lubricating system through the pleated paper annulus 13, thereby filtering the oil, which will then travel through the apertures 15 into the hollow cylinder 14 and thence back to the lubricating system by way of the aperture 25. Said movement of the oil is indicated by the arrows depicted in FIGURE 2.

Figure 2:
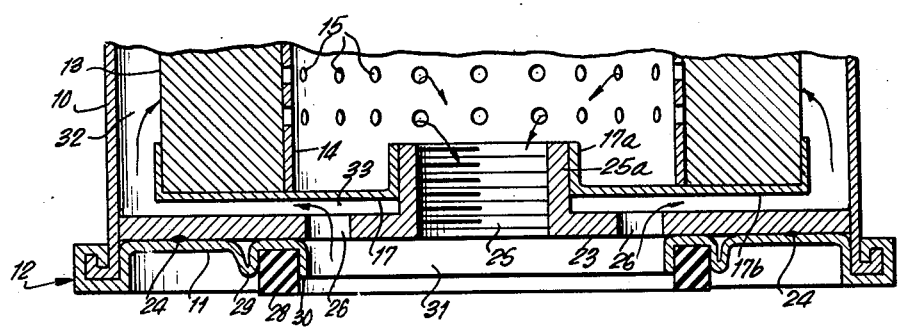
FIGURE 2 is an enlarged fragmentary cross-sectional view of the lower portion of the filter depicted in FIGURE 1 illustrating an open position of the anti-drainback means employed in the said form of the invention.

It will be noted that any drainback of unfiltered oil from the annular space 32 to the annular area 33 and the apertures 26 is obstructed by the lower cup 17 whose planar surface 17b is in contact with the plate 23 and sealably covers the apertures 26 whenever the pressure on said unfiltered oil is such as to cause it to tend to flow in a direction opposite to that indicated by the arrows in FIGURE 2. Thus, for example, when the engine is turned off so as to cause a sharp drop in the pressure of the lubricating system, the lower cup 17 will assume its closed position, thereby interfering with the drainback or return of any unfiltered oil from the annular space 32 through the apertures 26 to the said lubricating system.

It will be observed that the slidable contact between the sleeve 17a and the external periphery of the internally threaded tube 25a is a close contact, thereby obstructing the flow of oil between said sleeve 17a and the external periphery of the internally threaded tube 25a, and into the hollow cylinder 14. The internally threaded tube 25a is preferably elongated, as shown in the drawing so as to facilitate the slidable and accurate seating of the sleeve thereon.

The pleated paper annulus employed in the above-described form of the invention may be composed of a suitable filter paper of the type conventionally employed.

It will be noted that in the above-described form of the invention, when the pleated paper annulus becomes clogged, unfiltered oil will travel from the annular space 32 surrounding the filter medium to the space above the upper cup 16, into the hollow cylinder 14 by way of the aperture 22, the said oil depressing the disc 21 against the bias of the spring 20 so as to permit the oil to enter the slotted tubular member 19 and from there the hollow cylinder 14, from when the oil is returnable to the lubricating system. Since such a return is undesirable, it is conventional practice to deem the useful life of the filter at an end at this time and to discard the entire filter unit when said clogged condition occurs.

It will be seeen from the foregoing that during the useful life of the filter, the above described form of the invention is operative to provide efficient means for the prevention of drainback of unfiltered oil therefrom to the lubricating system with which it is employed. Moreover, by employing the lower cup 17 in conjunction with the plate 23 and the tube 25a in the above described manner, the necessity for additional anti-drainback mechanisms is eliminated.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

An improved oil filter comprising, in combination: a cup-shaped filter housing including an open end and a closed end; an end closure member secured to said open end of said filter housing; a filter cartridge within said housing; a rigid plate surmounting said end closure member and provided with a plurality of inlet apertures for the admission of unfiltered oil to the interior of said housing by means of a passage defined by the interior of said filter housing and the external periphery of said filter cartridge; said end closure including means defining a mouth in communication with said inlet apertures; the said filter cartridge including a filter media disposed between upper and lower end cups; spring means disposed between the closed end of said cup-shaped filter housing and said upper cup; said spring means normally biasing said lower cup into engagement with said rigid plate and obstructing said inlet apertures; said lower cup being selectively movable to a spaced relation with respect to said rigid plate and said inlet apertures by fluid under pressure exerted against said lower cup through said inlet apertures, whereby said unfiltered oil may enter said passage; the lower cup being normally biased into abutment with said rigid plate covering said inlet apertures upon reduction of said fluid pressure below a preselected level preventing drainage of said unfiltered oil out of said housing through said inlet apertures; said rigid plate including an axially disposed inwardly directed tubular flange portion encircling and defining an outlet; the said lower cup including an inwardly directed tubular sleeve slidably carried by said tubular flange of said rigid plate, said lower cup and said filter being movable with respect to said rigid plate and said inlet apertures to control the flow of fluid under pressure through said inlet apertures and out said outlet apertures in accordance with variations in pressure conditions.

References Cited in the file of this patent

UNITED STATES PATENTS

| | | |
|---|---|---|
| 2,562,361 | Kasten | July 31, 1951 |
| 2,873,029 | Humbert | Feb. 10, 1959 |
| 2,884,133 | Walulik et al. | Apr. 28, 1959 |
| 2,888,141 | Coates et al. | May 26, 1959 |
| 3,053,389 | Rosaen et al. | Sept. 11, 1962 |

FOREIGN PATENTS

| | | |
|---|---|---|
| 638,948 | France | Feb. 28, 1928 |